(12) United States Patent
Mangtani et al.

(10) Patent No.: US 10,395,293 B1
(45) Date of Patent: Aug. 27, 2019

(54) CANONICAL ORDER MANAGEMENT SYSTEM

(71) Applicant: PredictSpring, Inc., Los Altos, CA (US)

(72) Inventors: Nitin Mangtani, Los Altos, CA (US); Pranav Wankawala, Fremont, CA (US); Alex Martinovic, Cupertino, CA (US)

(73) Assignee: PredictSpring, Inc., Los Altos, CA (US)

( * ) Notice: Subject to any disclaimer, the term of this patent is extended or adjusted under 35 U.S.C. 154(b) by 347 days.

(21) Appl. No.: 15/247,597

(22) Filed: Aug. 25, 2016

(51) Int. Cl.
*G06Q 30/00* (2012.01)
*G06Q 30/06* (2012.01)
*G06Q 20/10* (2012.01)
*G06Q 10/08* (2012.01)

(52) U.S. Cl.
CPC ....... *G06Q 30/0623* (2013.01); *G06Q 10/087* (2013.01); *G06Q 20/102* (2013.01); *G06Q 30/0643* (2013.01)

(58) Field of Classification Search
CPC .............. G06Q 30/00; G06Q 30/0601; G06Q 30/0633; G06Q 30/0641
See application file for complete search history.

(56) References Cited

U.S. PATENT DOCUMENTS

| | | |
|---|---|---|
| 6,430,609 B1 | 8/2002 | Dewhurst et al. |
| 6,731,788 B1 * | 5/2004 | Agnihotri ............ G06K 9/3266 382/157 |
| 7,380,212 B2 | 5/2008 | Cody et al. |
| 7,552,222 B2 | 6/2009 | Garimella et al. |
| 8,261,231 B1 | 9/2012 | Hirsch et al. |
| 8,340,633 B1 | 12/2012 | Rege et al. |

(Continued)

FOREIGN PATENT DOCUMENTS

WO   WO 2015/088548   6/2015

OTHER PUBLICATIONS

Piao, Chunhui, and Xufang Han. "Study on Open APIs of E-Commerce Platforms and Design of a Third Party Application for Taobao." 2010 IEEE 7th International Conference on e-Business Engineering. IEEE, 2010. (Year: 2010).*

*Primary Examiner* — Christopher B Seibert
(74) *Attorney, Agent, or Firm* — Cooley LLP (57) ABSTRACT

The methods and apparatuses described herein generally relate to providing a platform for allowing a website user to select a product for purchase at a non-merchant website. For example, a commerce engine can receive a request to review product information from a non-merchant website, and can translate the request into a format that can be understood by at least one merchant server using at least one type of commerce platform. The commerce engine can send the translated requests to at least one merchant server, and the merchant servers that receive the requests can determine information about the product (e.g., remaining inventory at particular merchants, product price, and/or other product details). The merchant servers can provide this information to the commerce engine, which can send the product information to the non-merchant website. The commerce engine can also facilitate a transaction with the merchant server, based on the product information returned by the non-merchant website.

20 Claims, 8 Drawing Sheets

(56) References Cited

U.S. PATENT DOCUMENTS

| | | |
|---|---|---|
| 8,341,516 B1 | 12/2012 | Mason et al. |
| 8,412,623 B2 | 4/2013 | Moon et al. |
| 8,458,053 B1 * | 6/2013 | Buron .................... G06Q 30/06 705/14.4 |
| 8,539,544 B2 | 9/2013 | Garimella et al. |
| 8,606,635 B2 | 12/2013 | Evankovich et al. |
| 8,630,915 B1 * | 1/2014 | Mirchandani ...... G06Q 30/0601 705/26.1 |
| 8,660,912 B1 * | 2/2014 | Dandekar .............. G06Q 30/06 705/26.1 |
| 8,898,748 B2 | 11/2014 | Burks et al. |
| 8,954,950 B2 | 2/2015 | Ionfrida et al. |
| 8,978,006 B2 | 3/2015 | Hirsch et al. |
| 9,042,862 B2 | 5/2015 | Rege et al. |
| 9,268,562 B1 | 2/2016 | Mangtani et al. |
| 2004/0010462 A1 | 1/2004 | Moon et al. |
| 2006/0150178 A1 | 7/2006 | Jerrard-Dunne et al. |
| 2007/0050406 A1 * | 3/2007 | Byers ..................... G06F 16/48 |
| 2007/0106570 A1 * | 5/2007 | Hartman .............. G06Q 10/087 705/26.2 |
| 2007/0294240 A1 * | 12/2007 | Steele ...................... G06F 16/38 |
| 2009/0037291 A1 * | 2/2009 | Dawson ................. G06Q 30/02 705/27.2 |
| 2009/0249374 A1 | 11/2009 | Hepper et al. |
| 2010/0114654 A1 * | 5/2010 | Lukose .................. G06Q 30/00 705/14.54 |
| 2010/0299719 A1 | 12/2010 | Burks et al. |
| 2011/0276516 A1 * | 11/2011 | Pechenik ............... G06Q 10/10 705/36 R |
| 2012/0095828 A1 | 4/2012 | Evankovich et al. |
| 2012/0136756 A1 * | 5/2012 | Jitkoff ................ G06Q 30/0641 705/27.1 |
| 2013/0013427 A1 * | 1/2013 | Gonsalves ............. G06Q 30/02 705/14.73 |
| 2013/0218698 A1 | 8/2013 | Moon et al. |
| 2013/0238983 A1 | 9/2013 | Mason et al. |
| 2013/0247005 A1 | 9/2013 | Hirsch et al. |
| 2014/0282398 A1 | 9/2014 | Podolyak et al. |
| 2014/0282399 A1 | 9/2014 | Gorelik et al. |

* cited by examiner

CANONICAL ORDER MANAGEMENT SYSTEM

FIELD

One or more methods and apparatus described herein are generally related, for example, to facilitating communication between websites running on different application platforms, using a canonical order management system.

BACKGROUND

Internet users frequently use websites hosted on the Internet to perform a variety of actions. Typically, however, websites are configured for particular uses, or to communicate on particular platforms, e.g., to promote efficient website development. Without an ability to allow different types of websites to communicate with one another, website developers can be prevented from developing multi-purpose websites capable of communicating with a variety of different platforms and services.

As one example, consumers widely purchase products both in physical stores and on merchant websites offering products for sale. However, typically consumers find a product on a merchant website to purchase the product; typically, for example, consumers cannot find information about a product on a non-merchant website, and initiate a purchase of the product at that website. Building a non-merchant website that can facilitate transactions can be inefficient and costly for developers, at least due to difficulties in determining what merchants (if any) may stock a particular product, and in reconciling differences between how various merchant platforms process requests and/or process transactions.

Some known systems can use application programming interfaces (APIs) for retrieving product information from merchants. APIs, for example, can specify commands for retrieving data from merchant servers, for use in product transactions. Such implementations, however, involve a website developer who is generating a website that may include information relating to a product for sale at a variety of merchants to support API commands for each merchant, even if the website is not a merchant website (e.g., including social media websites, and/or the like). Such known systems, therefore, typically involve time and resource-intensive website implementations, as developers may store merchant APIs for facilitating merchant transactions, even if the website being developed by the developers is not a merchant website. Additionally, different merchants can operate using different e-commerce platforms that may use different APIs to communicate with websites. Thus, a developer using such known systems typically uses multiple APIs to communicate with different merchants using different e-commerce platforms. Each developer for each website may accordingly store copies of each API, resulting in an inefficient use of server resources.

SUMMARY

A need exists for systems and methods that can facilitate merchant transactions for good and services, even when said goods and services are first identified by a user on a non-merchant website. A need also exists for systems and methods that can facilitate such transactions across multiple merchants that may be using various merchant platforms operating using different e-commerce platforms.

The methods and apparatuses described herein generally relate to providing a platform for allowing a website user to communicate with servers using a first platform, via a website built using a second platform. For example, such a platform can allow consumers to purchase a product shown on a non-merchant website. A consumer can select a product for purchase, and the non-merchant website can use a single application programming interface (API) to generate a request for product information, to allow the non-merchant website to display more information about the product. A commerce engine can receive the request, and translate the request into at least one request of a format that can be understood by at least one merchant server using at least one type of commerce platform. The commerce engine can send the translated requests to at least one merchant server, and the merchant servers that receive the requests can determine information about the product (e.g., remaining inventory at particular merchants, product price, and/or other product details). The merchant servers can provide this information to the commerce engine, which can send the product information to the non-merchant website such that the non-merchant website can initiate a transaction with the consumer based on the product information. The commerce engine can also facilitate a transaction with the merchant server, without sending the product information to the non-merchant server, based on the product information returned by the non-merchant website. The commerce engine can also request consumer data, such as a shipping address and payment information, from the non-merchant website, and can verify the consumer data.

BRIEF DESCRIPTION OF THE DRAWINGS

The drawings are not necessarily to scale; in some instances, various aspects of the disclosure herein may be shown exaggerated or enlarged in the drawings to facilitate an understanding of different features. In the drawings, like reference characters generally refer to like features (e.g., functionally similar and/or structurally similar elements).

DETAILED DESCRIPTION

Apparatuses, methods, and systems herein generally relate to a system for facilitating purchases of products and/or services displayed on non-merchant websites. For example, a user can, using a mobile application, web browser, and/or the like, browse a non-merchant website, mobile application, and/or the like (e.g., including but not limited to social media websites such as Pinterest, Instagram, Twitter, Facebook, and/or the like; and/or other websites) that includes a photograph, video, and/or similar content that includes a product sold by a merchant unaffiliated with the non-merchant website. For example, a user can browse Instagram via a commerce engine mobile application, and/or via the Instagram website, and can view an image of a dress that is sold by a merchant, independent of Instagram. The user can select the image within the commerce engine mobile application so as to obtain information relating to the dress in the image, and/or can otherwise be presented with an option to obtain further information relating to the dress in the image. A commerce engine (also referred to herein as a platform-agnostic engine) can translate and/or convert a message sent from Instagram and including information relating to the dress in the image, so as to retrieve information relating to the dress from merchant servers associated with merchants who may be selling the dress. The merchant servers can return information that the commerce engine can provide to Instagram, where the information can be displayed for the user's review in the Instagram interface. The user can then initiate a purchase for the dress through the Instagram interface, which can be processed and fulfilled by the commerce engine, e.g., in communication with at least one merchant server.

Figure 1:
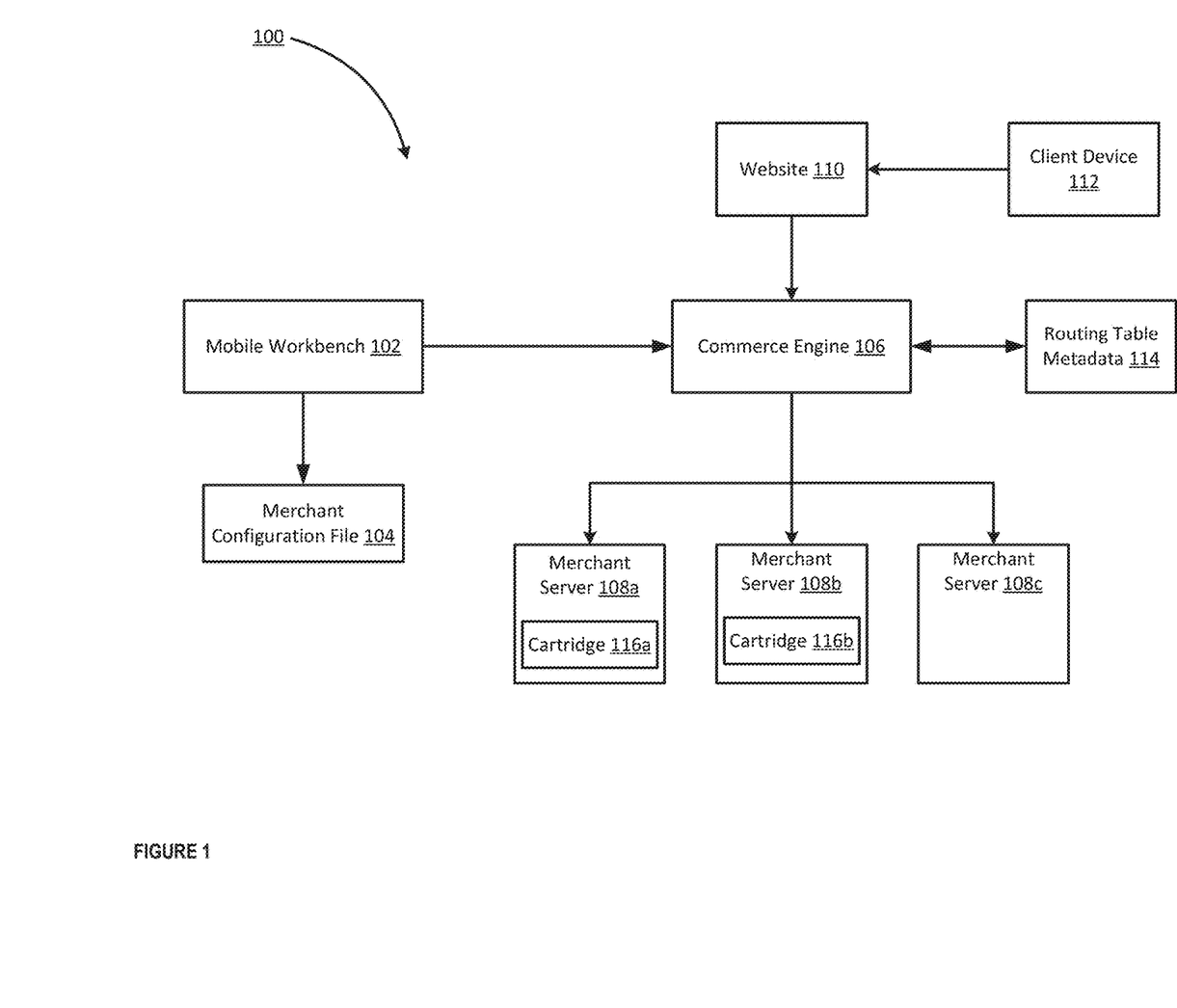
FIG. 1 is a schematic diagram illustrating a commerce engine system including a commerce engine, a non-merchant website, and merchant servers that facilitates communication between a website and merchant servers that use different platforms to communicate, according to an embodiment.

FIG. 1 is a schematic diagram illustrating a commerce engine system 100. For example, in some implementations, a commerce engine 106 can be an apparatus configured to receive messages from non-merchant websites 110 (and/or similar web interfaces, such as mobile applications, and/or the like), to translate and/or convert information in the messages into messages and/or signals that can be processed at merchant servers 108a-c, and to translate and/or convert information from the merchant servers 108a-c into messages and/or signals that can be processed by the non-merchant websites 110. Specifically, a merchant administrator (not shown) can use a mobile workbench 102 implemented at a merchant device (not shown) to generate a merchant configuration file 104 that can be stored at the merchant device, and used to provide information to the commerce engine 106, e.g., including content attributes tracked and/or maintained by a merchant platform implemented on the merchant server 108a. For example, the merchant configuration file 104 can include field identifiers and/or names, and/or other information, that can be used to determine attributes that the merchant can collect and/or otherwise obtain from users, for initiating purchase requests and/or other actions. Further information regarding the mobile workbench 102 and the merchant configuration file 104 can be found in application Ser. No. 14/601,847, filed Jan. 21, 2015, which is incorporated by reference herein in its entirety.

The commerce engine 106 can use the field identifiers, settings configuration data, and/or other information obtained from the mobile workbench 102 to generate a mapping schema (not shown). For example, the mapping schema may be a JSON schema and/or a similar data structure that can allow the commerce engine 106 to translate information from the merchant server 108a to an intermediate format (e.g., a canonical format). The commerce engine 106 can, for example, generate a mapping schema that maps fields and/or attributes supported by a merchant platform on which a merchant website and/or mobile application hosted by the merchant server 108a has been developed, to a platform-independent format. The commerce engine 106 can store data from the merchant server 108a after the data has been translated and/or converted into the platform-independent format.

In some implementations, the merchant server 108a can include a cartridge 116a that can include a mapping of platform-dependent application software interface (API) commands to merchant-specific commands (e.g., can map commands associated with an e-commerce and/or similar platform implemented at a website and/or mobile application associated with a merchant, to commands specific to the merchant server 108a). The commerce engine 106 can send instructions to retrieve data, to initiate transactions, and/or to perform other actions to the merchant server 108a, where the instructions include platform-specific API commands. The merchant server 108a can then use the cartridge 116a to process the instructions sent from the commerce engine 106, and to perform the associated action. For example, a platform-dependent API 208 (shown in FIG. 2) stored in a cartridge 116a of a merchant server 108a can include a platform-dependent command to retrieve information relating to a specific product from a database. The commerce engine 106 can generate and send a platform-specific API command to retrieve data to the merchant server 108a, including the platform-dependent command to retrieve the product information.

The merchant server 108a can then use the cartridge 116a to translate and/or convert the platform-specific API command into a merchant server-specific query command executable by the merchant server 108a. The merchant server 108a can query its database for the relevant product information, and can return the retrieved data to the commerce engine 106 for processing (e.g., using the cartridge 116a to translate and/or convert the response generated by the merchant server 108a into a platform-specific results response that can be sent to the commerce engine 106). The commerce engine 106 can then translate and/or convert the platform-specific data and/or response obtained from the merchant server 108a into platform-independent product data (e.g., using the mapping schema), and can store the platform-independent product data (e.g., in memory 216 (shown in FIG. 2), and/or the like). In some implementations, a merchant server 108a may not include a cartridge 116a, and can directly process a platform-specific API command, e.g., without translating the platform-specific API command into a merchant server-specific query command.

In some implementations, the commerce engine 106 can also receive messages from a client device 112, e.g., via a non-merchant web site 110. For example, a customer using a client device 112, such as a smartphone, tablet, or computer, to access a non-merchant website 110, can select products and/or services shown in the non-merchant website 110, for purchase. The non-merchant website 110, to facilitate the transaction, can send a message to the commerce engine 106 indicating that the customer indicated a desire to purchase the product and/or service, including information about the customer, or information about the product and/or service. The commerce engine 106 can, using the mapping schema, translate the message into an intermediate (e.g., canonical) format, and can then use one or more platform-specific modules (shown in FIG. 2) to translate the canonically-formatted message into at least one platform-specific message, including platform-dependent API commands to retrieve information related to the product. The commerce engine 106 can use the routing table metadata 114 to determine which merchant servers 108*a-c* to send the at least one platform-specific message.

The commerce engine 106 can receive product information from one or more merchant servers 108*a-c*, indicating an inventory of the product, and/or other information relating to the product and/or service. The commerce engine 106 can then convert the results into a data format that can be processed by a server (not shown) hosting the non-merchant website 110, using the mapping schema. The commerce engine 106 can send the results in that format to the server hosting the non-merchant website 110. The non-merchant website 110 can provide additional information to the commerce engine 106, and the commerce engine 106 can continue to serve as an intermediary between the merchant servers 108*a-c* and the non-merchant website 110. The commerce engine 106 can also initiate a transaction process between the consumer and a merchant server 108*a*, using information received from the non-merchant website 110.

Figure 2:
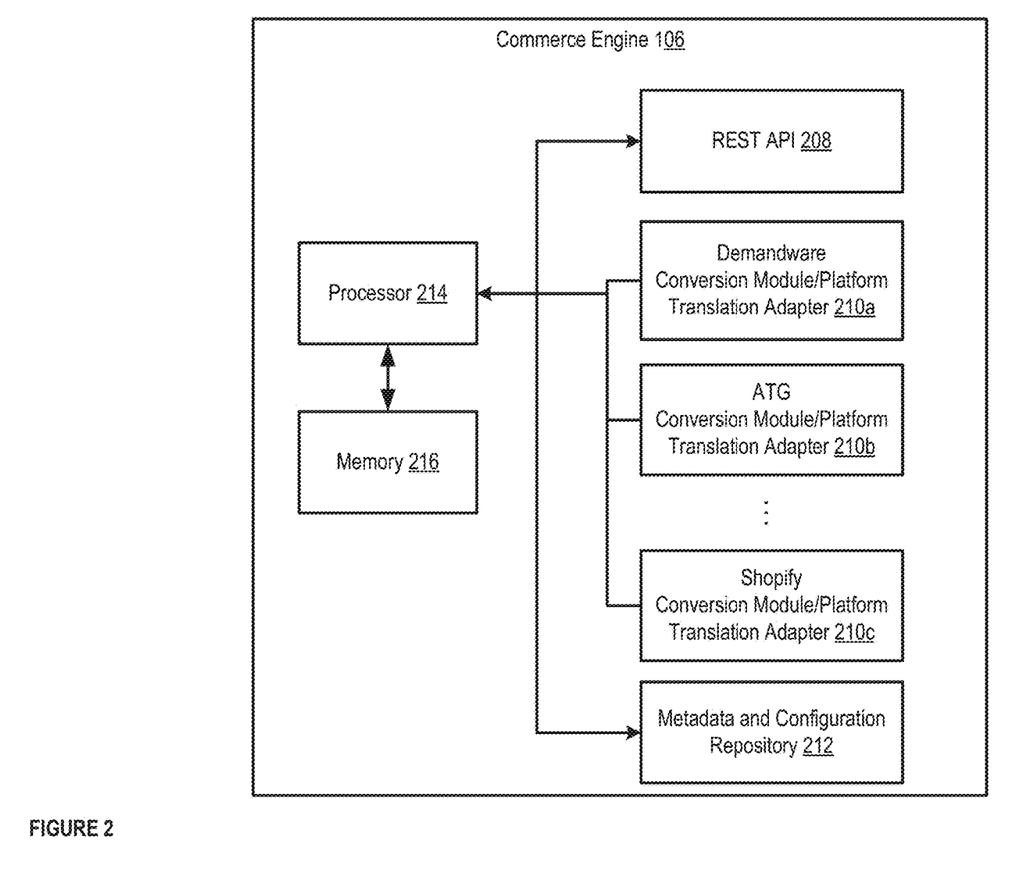
FIG. 2 is a schematic diagram illustrating a commerce engine configured to translate requests from websites into requests that can be processed by servers using different platforms, according to an embodiment.

FIG. 2 is a schematic diagram illustrating a commerce engine 106 configured to translate requests from websites into requests that can be processed by servers using different platforms. For example, in some implementations, a commerce engine 106 can include at least one processor 214, at least one memory 216, at least one API 208 (e.g., such as a representational state transfer (REST) API), multiple conversion modules 210*a-c* (e.g., also referred to herein as "platform translation adapters"), and a metadata and configuration repository 212. The at least one processor 214 can be any hardware module and/or component configured to receive and process data, and/or to execute code representing executable instructions. In some embodiments, the at least one processor 214 can be a general purpose processor, a Field Programmable Gate Array (FPGA), an Application Specific Integrated Circuit (ASIC), a Digital Signal Processor (DSP), and/or the like.

The at least one memory 216 can be a hardware module and/or component configured to store data accessible by the at least one processor 214, and/or to store code representing executable instructions for the at least one processor 214. The at least one memory 216 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 216 stores instructions to cause the processor 214 to execute modules, processes and/or functions associated with the commerce engine 106.

The at least one processor 214 can implement a number of modules, compute devices, and/or server components, including but not limited to the conversion modules 210*a-c*. The at least one processor 214 can be configured to execute instructions generated by any of the modules and/or server components, and/or instructions stored in the memory 216. In some implementations, if the commerce engine 106 includes multiple processors 214, the modules and/or server components can be distributed among and/or executed by the multiple processors 214. The at least one memory 216 can be configured to store processor-readable instructions that are accessible and executable by the at least one processor 214.

In some implementations, the modules, compute devices, and/or server components can be implemented on the at least one processor 214 (e.g., as software executed on and/or implemented by the processor 214). In some implementations, the modules, compute devices, and/or server components can be software stored in the memory 216 and executed and/or instantiated by the processor 214. In other implementations, the modules, compute devices, and/or server components can be any assembly and/or set of operatively-coupled electrical components separate from the processor 214 and the memory 216, including but not limited to field programmable gate arrays (FPGAs) and/or application-specific integrated circuits (ASICs).

The conversion modules 210*a-c* can be modules and/or server components configured to translate and/or convert information from a non-merchant website 110 into a platform-specific format, and/or can convert platform-specific merchant information received from a merchant server 108*a* into a format processable by the non-merchant website 110. Each conversion module 210 can be associated with a particular e-commerce and/or similar web platform; for example, as one example, a set of conversion modules 210*a-c* of a commerce engine 106 can include a Demandware conversion module 210*a*, an ATG conversion module 210*b*, a Shopify conversion module 210*c*, and/or conversion modules for other e-commerce platforms.

As one example, a Demandware conversion module 210*a* can be configured to receive a request from a non-merchant website 110 for product information, and can use a mapping schema stored at the commerce engine 106 to convert the request into a canonical format (e.g., an intermediate, platform-independent format). The Demandware conversion module 210*a* can then use the canonically-formatted request, and API commands associated with the Demandware conversion module 210*a*, to generate a Demandware-formatted request for product data from a merchant implementing the Demandware e-commerce platform. The Demandware-formatted request can include Demandware API commands that are included in the at least one API for retrieving product data. The Demandware conversion module 210*a* can send the Demandware-formatted request to a server associated with the merchant (such as merchant server 108*a*), and can translate and/or convert any data received from the merchant server 108*a* into a canonical format (e.g., an intermediate, platform-independent format) that can be stored at the commerce engine 106.

The at least one API 208 can be at least one API stored in the at least one memory 216 that can include platform-specific instructions for retrieving and/or otherwise processing product data, e.g., based on requests being sent by a non-merchant website 110. For example, the commerce engine 106 (e.g., via a conversion module 210) can convert a message from the non-merchant website 110 into a canonical format, and can convert the canonically-formatted message into a platform-specific message, e.g., using one of the conversion modules 210*a-c*. The conversion module 210 can determine platform-specific commands in the API 208 to include in the platform-specific message, and can incorporate the platform-specific commands into the platform-specific message. For example, each conversion module 210 can be associated with a particular set of commands included in the at least one API 208, such that that conversion module 210 can incorporate a command from that particular set of commands into a platform-specific message when generating the platform-specific message for a merchant server 108*a*.

In some implementations, the metadata and configuration repository 212 can be a data store (e.g., a database and/or similar structure) operatively coupled to the commerce engine 106, and/or can be a location in the at least one memory 216, that can store information including routing table metadata 114, product metadata, the mapping schema, authentication data, and/or other information. The routing table metadata 114 can include a routing table that can include information for routing requests for product data to particular merchant servers 108a-c. For example, the routing table can include mappings between merchant identifiers included in non-merchant website requests and at least one address of merchant servers 108a-c associated with the merchant identifiers. For example, after receiving product information from the commerce engine 106, the non-merchant website 110 can send a message to the commerce engine 106 to initiate a transaction. The commerce engine 106 can use a merchant identifier included in the message to route a message to a specific merchant server 108a, e.g., for updated product information, and/or the like.

In some implementations, the product metadata can include metadata associated with products, such as product inventory information, product discount information, a list of merchants at which the product may be available, transaction history information, and/or other information that can be associated with products sold by merchants associated with the merchant servers 108a-c. The mapping schema can be a schema (e.g., a format specification) that specifies a canonical (e.g., platform-independent) format for which to store product metadata. For example, the mapping schema can specify how to store customer data, order data, product data, product availability data, promotional and/or product discount data, and/or other data. The mapping schema can also include instructions and/or mappings that can be used to translate and/or convert data received in a non-canonical format (e.g., received in a non-merchant website format and/or a platform-specific format) into the canonical format.

As one example, an example format for order data can be specified by a JavaScript Object Notation (JSON) data structure resembling the following:
{
  "paymentData": {
  "giftCardList": [
    {
      "cardNum": "123456789",
      "balance": "20.00",
      "cardPin": "678"
    },
    {
      "cardNum": "987654321",
      "balance": "15.00",
      "cardPin": "234"
    }
  ],
  "paymentCard": {
    "ccNumber": "4111111111111111",
    "ccExpiration": "11/22",
    "cardType": "VISA",
    "ccCode": "222"
  }
  },
  "billingAddress": {
  "firstName": "John",
  "secondName": "Doe",
  "lastName": "Smith",
  "address1": "123 Main St",
  "city": "Los Altos",
  "state": "CA",
  "postalCode": "94022",
  "countryCode": "US"
  },
  "shippingMethodId": "Overnight",
  "grandTotal": 199.98,
  "products": [
    {
      "productId": "101",
      "price": 19.95,
      "quantity": 3
    }
    {
      "productId": "102",
      "price": 99.95,
      "quantity": 1
    }{
      "productId": "103",
      "price": 49.00,
      "quantity": 4
    }
  ]
}

In some implementations, the metadata and configuration repository 212 can also store information for processing and/or authenticating requests, including protocol translation information, authentication keys and/or certificates, and/or the like. For example, the metadata and configuration repository 212 can include instructions and/or mappings that allow the commerce engine 106 (e.g., via one of the conversion modules 210a-c) to include authentication certificates and/or other authentication information in messages to merchant servers 108a-c and/or non-merchant websites 110. The metadata and configuration repository 212 can also include instructions or mappings that can allow the conversion modules 210a-c to further format requests sent from the commerce engine 106 into a particular protocol format (e.g., into File Transfer Protocol (FTP), and/or a similar protocol). Information stored in the metadata and configuration repository 212 can be obtained from merchant servers 108a-c, from non-merchant websites 110, and/or from other sources.

Figure 3:
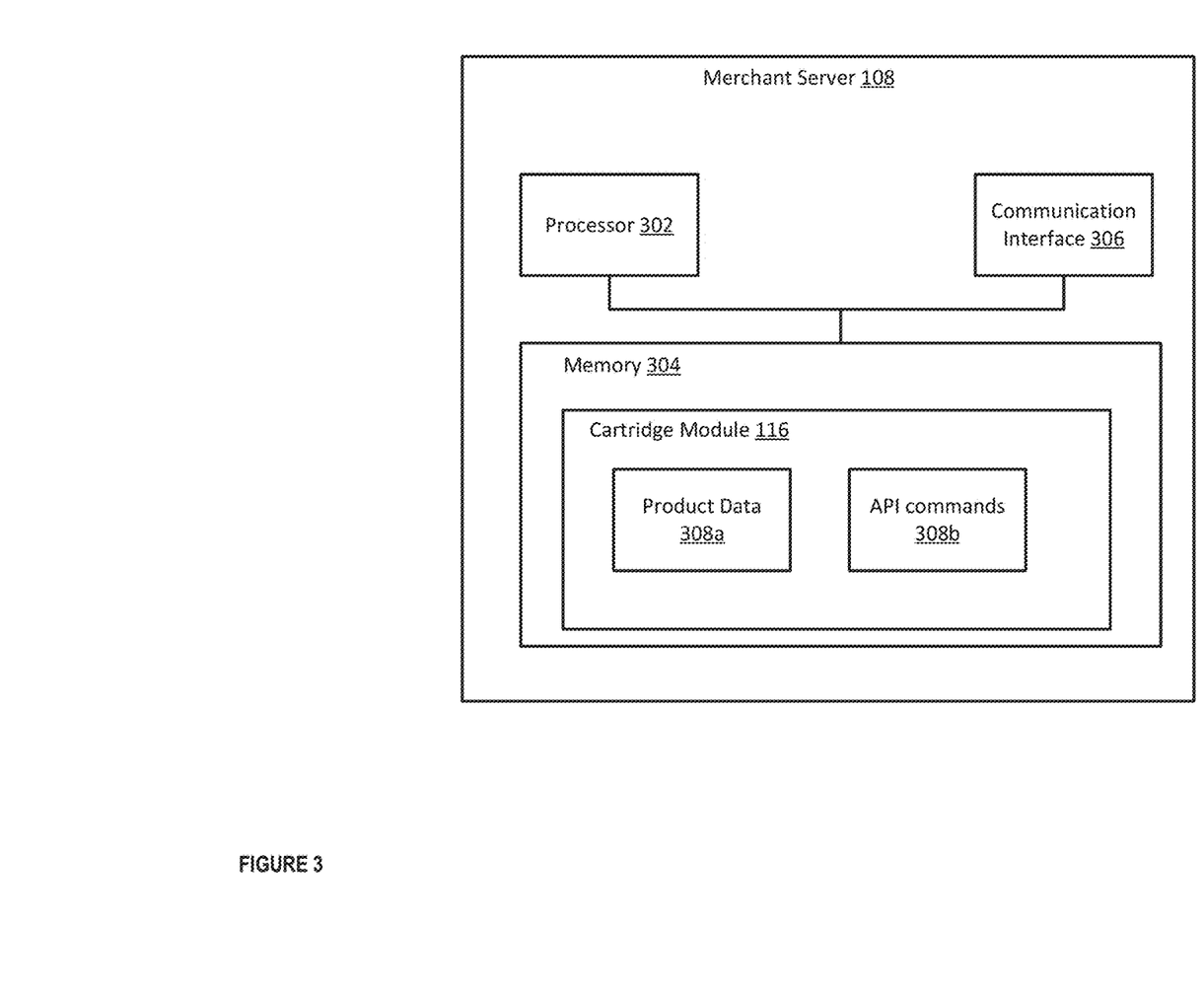
FIG. 3 is a schematic diagram illustrating a merchant server including a module for understanding commands from the commerce engine, according to an embodiment.

FIG. 3 is a schematic diagram illustrating a merchant server 108a including a module for understanding commands from the commerce engine 106. For example, in some implementations, a merchant server 108a can include at least one processor 302, at least one memory 304, and at least one communication interface 306. The at least one processor 302 and at least one memory 306 can be configured in a manner similar to the at least one processor 214 and at least one memory 216 of the commerce engine 106. In some implementations, a communication interface can be a wired and/or wireless interface configured to facilitate communication between the merchant server 108a and the commerce engine 106, merchant databases, and/or other entities connected to the merchant serve 108a, e.g., via one or more networks (e.g., to which merchant servers 108, commerce engine 106, website 110 and client device 112 are connected) (not shown).

In some implementations, the at least one memory 304 can also include a cartridge (also referred to herein as a cartridge module) 116 including product data 308a and/or information relating to platform-specific API commands 308b. The product data can include data retrieved from at least one database (not shown) associated with the merchant server 108a. The product data can relate to products for which one or more consumers have requested data. The information relating to platform-specific API commands can include API commands for an e-commerce and/or other software platform implemented by the merchant server 108a, and a mapping between the platform-specific API commands and merchant server-specific commands. For example, a platform-specific API command can specify a command specified by a particular e-commerce and/or other platform, for retrieving information, and/or performing other actions. A merchant server-specific command can be a command in a format particularly suited to retrieve data stored in the at least one memory and/or a database associated with the merchant.

The at least one processor 302 can be configured to receive platform-specific API commands from the commerce engine 106, and can use the platform-specific API commands stored in the cartridge module 116a to generate merchant server-specific instructions to retrieve product data, e.g., from memory, and/or from at least one database associated with the merchant server 108a. The at least one processor 214 can use information included in the platform-specific API commands in the cartridge module 116a to generate merchant server-specific commands for retrieving product data, and/or performing other actions. In some implementations, a merchant server 108a can directly process platform-specific API commands. In such implementations, the merchant server 108a may not include a cartridge module 116a, and/or may not use information relating to the platform-specific API commands stored in the cartridge module 116a to determine merchant server-specific commands to execute at the merchant processor.

Figure 4:
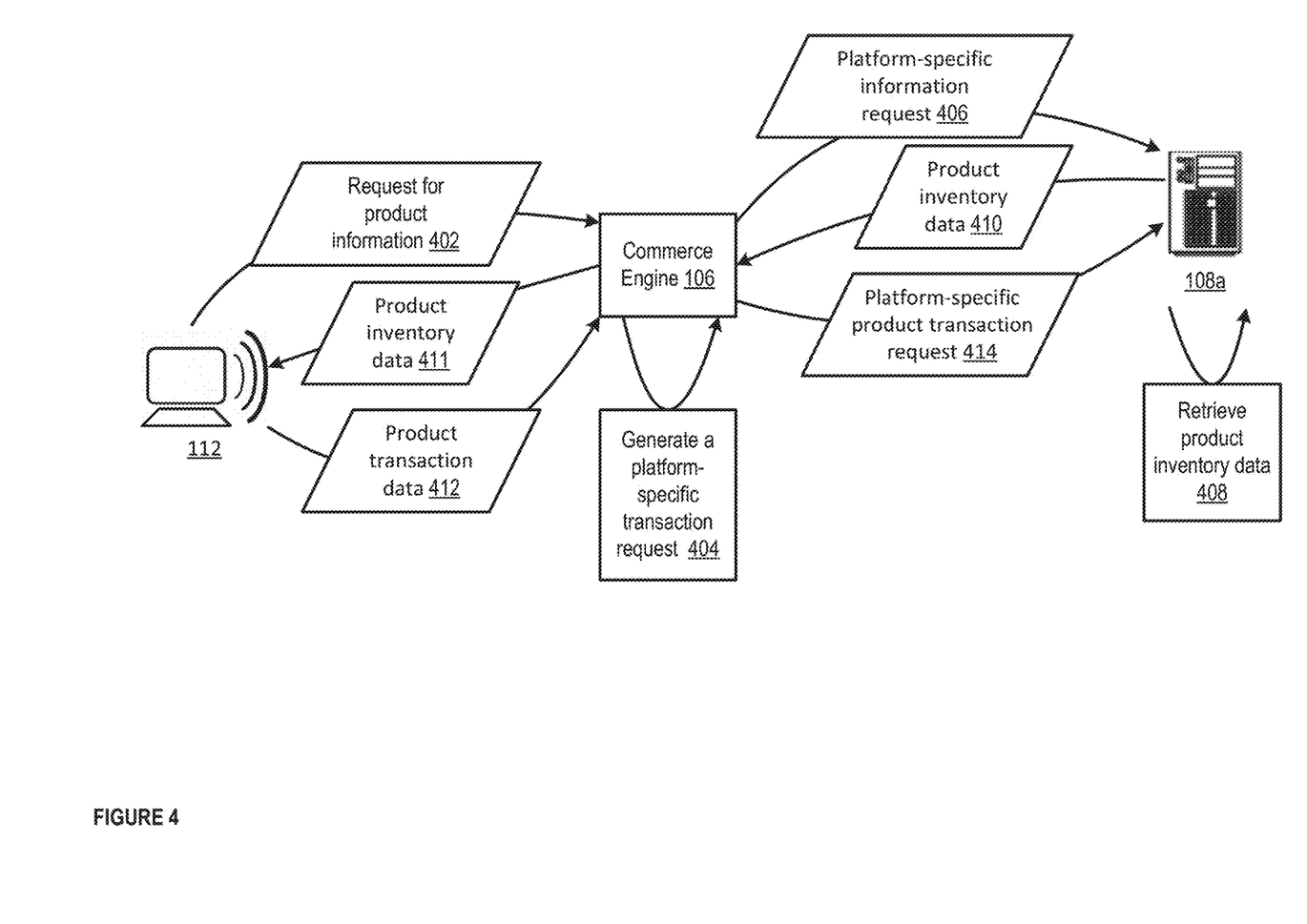
FIG. 4 is a data flow diagram illustrating sending a request for product information from a non-merchant website to at least one merchant server operating on a different development platform, according to an embodiment.

FIG. 4 is a data flow diagram illustrating sending a request for product information from a non-merchant website 110 to at least one merchant server 108a operating on a different development platform. For example, in some implementations, a client device 112 (e.g., a smartphone, tablet, or computer connecting via a non-merchant website 110 or non-merchant app) can send a request for product information 402 to the commerce engine 106. The product information request 402 can include information about a product selected by a consumer, including for example a product name, a product description, an image of the product and/or other information that can identify a product displayed on a non-merchant website 110. The commerce engine 106 can, at 404, generate at least one platform-specific information request 406 (e.g., using at least one conversion module 210a-c) to send to at least one merchant server 108a that may include the product in its inventory.

The at least one merchant server 108a can, at 408, retrieve product inventory data for the product (e.g., information indicating whether the product is or is not in stock at that merchant, versions of the product that are in stock, and/or the like), and can send the product inventory data 410 to the commerce engine 106. For example, the commerce engine 106 can receive an indication that a product is in stock at a particular merchant, the number of items in stock, any variations of the product that are in stock (e.g., different colored versions of the product, different size variations of the product, and/or the like). As one example, if a user selects a picture of a dress on Pinterest, the commerce engine 106 can receive, from a merchant server 108a, an indication of whether or not a merchant associated with the merchant server 108a has the dress in stock, what sizes the merchant has in stock, whether the merchant has the same dress in other colors in stock, and/or the like.

The commerce engine 106 can translate and/or convert the product inventory data into a non-merchant website-friendly format, and can send the converted product inventory data 411 to the non-merchant website 110, such that the product inventory information can be rendered in the non-merchant website 110 being accessed by the client device 112. The client device 112, via the non-merchant website 110, can then send a product transaction data request 412 to the commerce engine 106, e.g., to initiate a transaction to purchase the product for which the product inventory information was retrieved. The commerce engine 106 can generate at least one platform-specific transaction request 414, e.g., using a conversion module 210 associated with the merchant server 108a that provided product inventory information indicating that the merchant associated with the merchant server 108a has the product in stock. The commerce engine 106 can send the platform-specific product transaction request 414 to the merchant server 108a, to initiate a transaction for the product. In this manner, the commerce engine 106 can translate and/or convert messages and/or data sent between a merchant server 108a and a non-merchant website 110, such that the data can be processed by different entities, without each entity having knowledge of a particular format used by the other entity (e.g., without the merchant server 108a storing information about how the non-merchant website 110 presents and/or represents data, and without the non-merchant website 110 including forms and/or fields specific to a particular merchant server 108a).

Figure 5A:
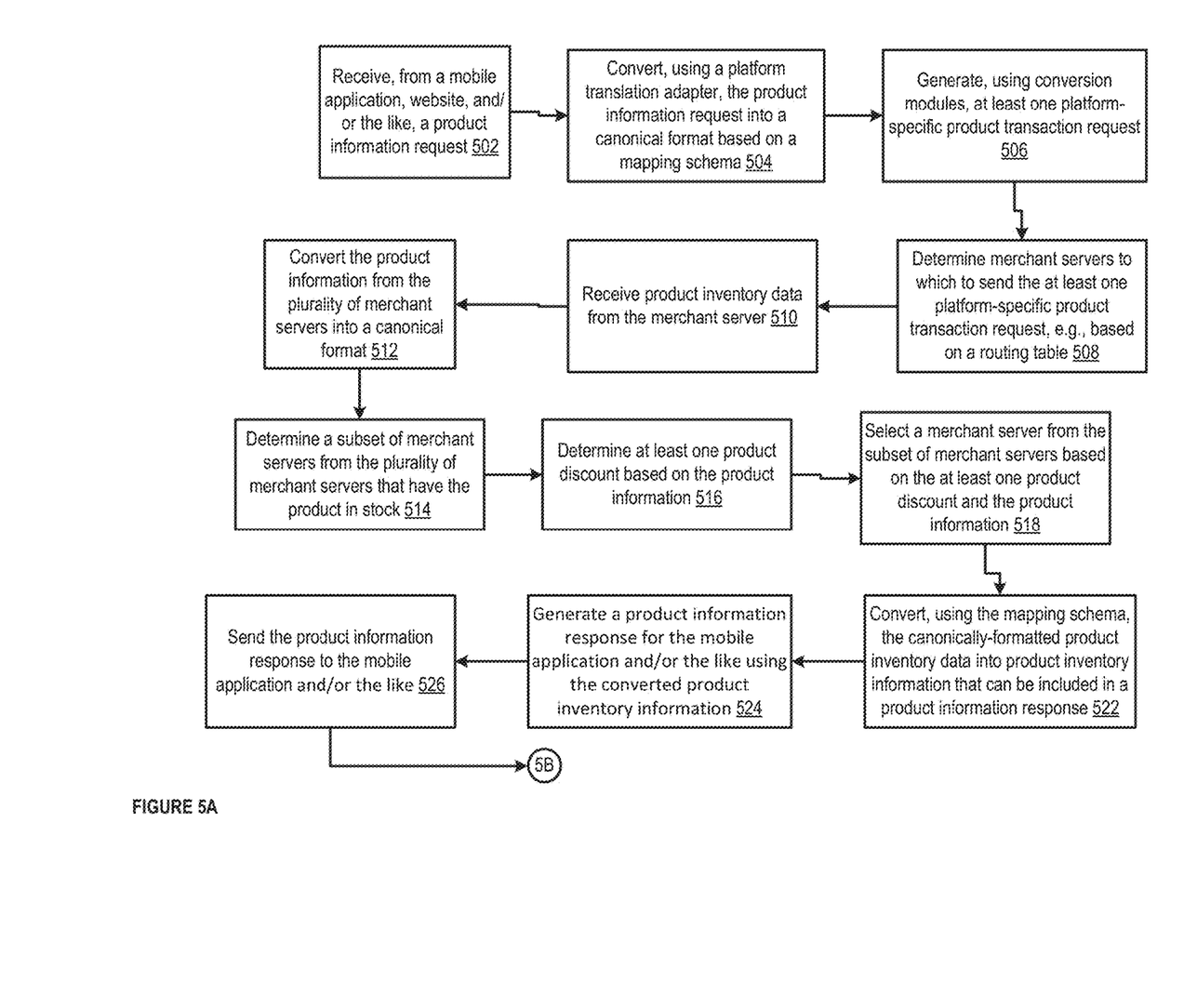
FIGS. 5A-B is a flow diagram illustrating converting a product information request into a platform-specific request using a commerce engine and a cartridge module, according to an embodiment.
Figure 5B:
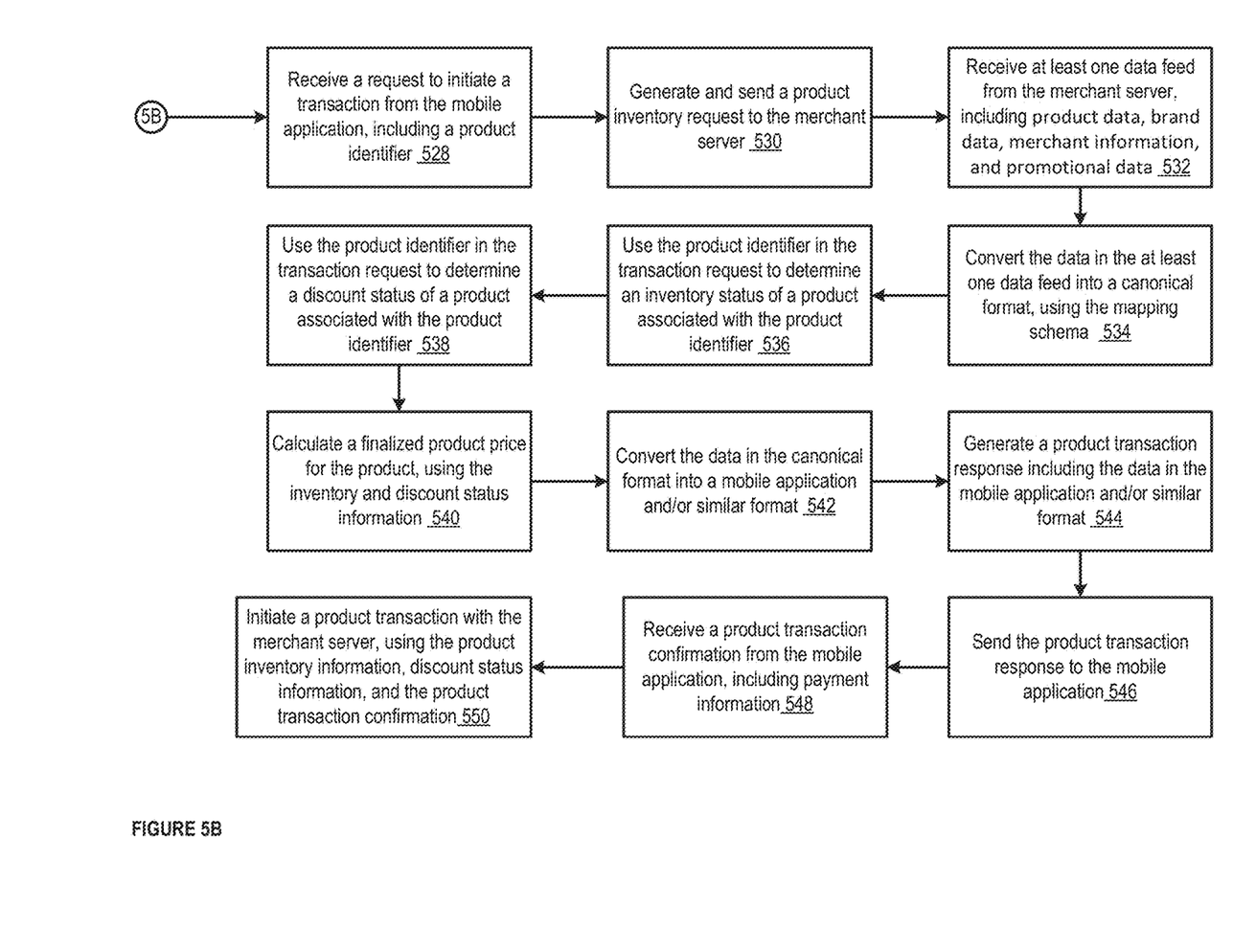

FIGS. 5A-B are flow diagrams illustrating converting a product information request into a platform-specific request using a commerce engine 106 and a cartridge module 116a. For example, in some implementations, a commerce engine 106 can (e.g., at the at least one processor 214) receive, at 502 and from a non-merchant mobile application, website, and/or the like 110, a product information request. The product information request can include information that the non-merchant website 110 has with respect to a product that has been found on the non-merchant website 110, and can be sent to the commerce engine 106 in response to a user clicking the product, and/or otherwise indicating a desire to obtain more information relating to the product.

The commerce engine 106 can retrieve product information from multiple merchant servers 108a-c. For example, the commerce engine 106 (e.g., via the at least one processor 214) can, at 504, convert the information from the product information request into a canonically-formatted request for product information, e.g., using a mapping schema. The at least one processor 214 can instruct at least a portion of the conversion modules 210a-c to, at 506, generate platform-specific product information requests, e.g., via translating the canonically-formatted request for product information. For example, the at least one processor 214 can instruct a first conversion module 210a to generate a first platform-specific product information request in a first platform format; the at least one processor 214 can instruct a second conversion module 210b to generate a second platform-specific product information request in a second platform format. The at least one processor 214 can instruct multiple conversion modules 210a-c to generate multiple platform-specific product information requests, so as to request data from multiple merchant servers 108a-c implementing multiple different platforms. Using the routing table metadata 114 stored in the metadata and configuration repository 212, each conversion module 210 can, at 508 and after generating a platform-specific product information request, determine at least one merchant server 108a to which to send the platform-specific product information request. For example, each merchant server 108a-c can be associated with a particular platform; the conversion modules 210a-c can determine, using the routing table metadata 114, which merchant servers 108a-c are associated with which platforms, so as to determine which merchant servers 108a-c can receive a given platform-specific product information request. The merchant servers 108a-c, based on the platform-specific product information request, can return product inventory and/or other information, based on the information provided about the product in the platform-specific product information request.

The commerce engine 106 can determine a subset of merchant servers, from the multiple merchant servers 108a-c to which platform-specific product information requests were sent, that have the product in stock. For example, each conversion module 210 of the commerce engine 106 can, at 510, receive product inventory information from at least some of the multiple merchant servers 108a-c, and can, at 512, convert and/or translate the product inventory information into a canonical format, e.g., using the mapping schema. The at least one processor 214 can then, at 514, determine a subset of merchants that have the product in stock. The at least one processor 214 can also, at 516, determine at least one product discount for the product that is being offered by at least one of the merchant servers, based on the product inventory information. The at least one processor 214 can, at 518, select a merchant server 108a from the subset of merchant servers, based on the inventory information and the product discount information. For example, the at least one processor 214 can select a merchant server 108a based on a price of the product at the merchant server 108a (e.g., where the merchant server 108a is offering the least expensive overall cost for the product), having the most inventory of the product (e.g., an availability of a product at a merchant associated with the merchant server 108a), shipping times (e.g., based on a distance between the merchant and a geographic location associated with the client device on which the mobile application is instantiated) and/or can select a merchant server 108a based on other reasons, using the product inventory information and the product discount information.

The at least one processor 214 can then process the product information received from that merchant server 108a, for sending to the non-merchant website 110. For example, at 522, the at least one processor 214 can convert, using the mapping schema, the canonically-formatted product inventory data retrieved from the selected merchant server 108a into product inventory information that can be included in a product information response to the non-merchant website 110 (e.g., in a non-merchant website format). The commerce engine 106 can then, at 524, generate a product information response for the non-merchant website, mobile application, and/or the like 110, using the converted product inventory information, and can, at 526, send the product inventory response to the non-merchant website, mobile application, and/or the like 110.

Referring to FIG. 5B, in some implementations, the commerce engine 106 can subsequently receive, at 528, a request, from the non-merchant mobile application, website, and/or the like 110, to initiate a transaction with the merchant server 108a. The product transaction request can include a product identifier, a merchant identifier, and/or other information for initiating a transaction. The commerce engine 106, e.g., via the at least one processor 214 and the conversion modules 210a-c, can, at 530, generate and send a product inventory request to the merchant server 108a (e.g., using a process similar to FIG. 5A), so as to verify that the inventory for the product at the merchant associated with the merchant server 108a, has not been depleted. The commerce engine 106 (e.g., via the at least one processor 214) can, at 532, receive at least one data feed from the merchant server 108a. For example, the at least one processor 214 can receive a product inventory information data feed, a product discount information data feed, a brand data feed, a merchant information data feed, and/or other information associated with the product and/or the merchant selling the product. A conversion module 210 can, at 534, convert the data received from the merchant server 108a into a canonical format, e.g., using the mapping schema.

The at least one processor 214 can, at 536, use a product identifier in the product transaction request to determine an inventory status of a product associated with the product identifier, e.g., based on searching the data from the product inventory data feed that has been converted into the canonical format. The at least one processor 214 can also, at 538, use the product identifier to determine a discount status of a product associated with the product identifier, e.g., by searching data converted into the canonical format from the product discount data feed. The at least one processor 214 can, at 540, calculate a finalized product price for the product, using the inventory and discount status information. The at least one processor 214 can, at 542, convert the data converted into the canonical format, into a non-merchant mobile application and/or similar format, so as to send the data to the non-merchant website 110. The at least one processor 214 can, at 544, generate a product transaction response to the non-merchant mobile application and/or website 110, e.g., based on the data converted into the non-merchant mobile application and/or similar format. The at least one processor 214 can, at 546, send the product transaction response to the non-merchant mobile application and/or website 110. The at least one processor 214 can, at 548, receive a product transaction confirmation from the non-merchant mobile application and/or website 110, indicating that a consumer would like to proceed with purchasing the product, based on the provided product discount and/or inventory information. In some implementations, the product transaction confirmation can include payment information for arranging payment of the product with the merchant server 108a. The at least one processor 214 can then, at 550, initiate a product transaction with the merchant server 108a, using the product inventory information, the discount status information, and the information included in the product transaction confirmation.

Figure 6:
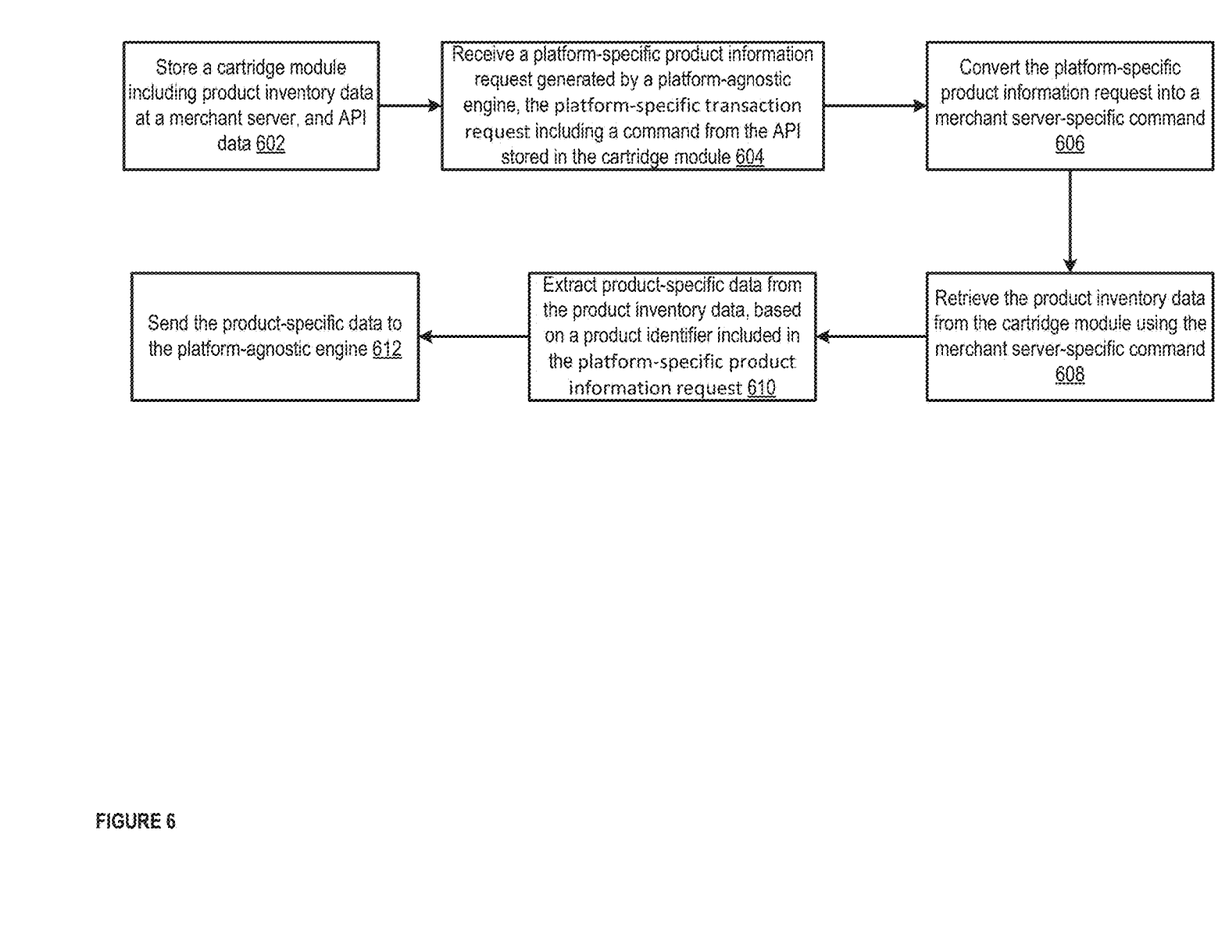
FIG. 6 is a flow diagram illustrating implementing a cartridge module on a merchant server receiving commands from a commerce engine, according to an embodiment.

FIG. 6 is a flow diagram illustrating implementing a cartridge module 116a on a merchant server 108a receiving commands from a commerce engine 106. For example, in some implementations, a merchant server 108a can, at 602, store a cartridge module 116a that includes product inventory data that is stored at the merchant server 108a and/or a database associated with the merchant server 108a, and API data 208 relating to mappings between platform-specific API commands and merchant server-specific commands. The merchant server 108a can, at 604, receive a platform-specific product information request that has been generated by the commerce engine 106. The platform-specific product information request can request information relating to a product found on a non-merchant website 110. The merchant server 108a can, at 606, convert the platform-specific product information request into a merchant server-specific command. The merchant server 108a can, at 608, retrieve product inventory data for products sold by a merchant associated with the merchant server 108a, from the cartridge module 116a and/or other data stores (e.g., memory, and/or a database) associated with the merchant server 108a. The merchant server 108a can, at 610, extract product-specific data from the product inventory data, e.g., based on a product identifier and/or other information included in the platform-specific product information request. The merchant server 108a can then, at 612, send the product-specific data to the commerce engine 106 for processing. In some implementations, the merchant server 108a can use the API data

208 to convert the product-specific data into a platform-specific format, prior to sending the product-specific data to the commerce engine 106.

Figure 7:
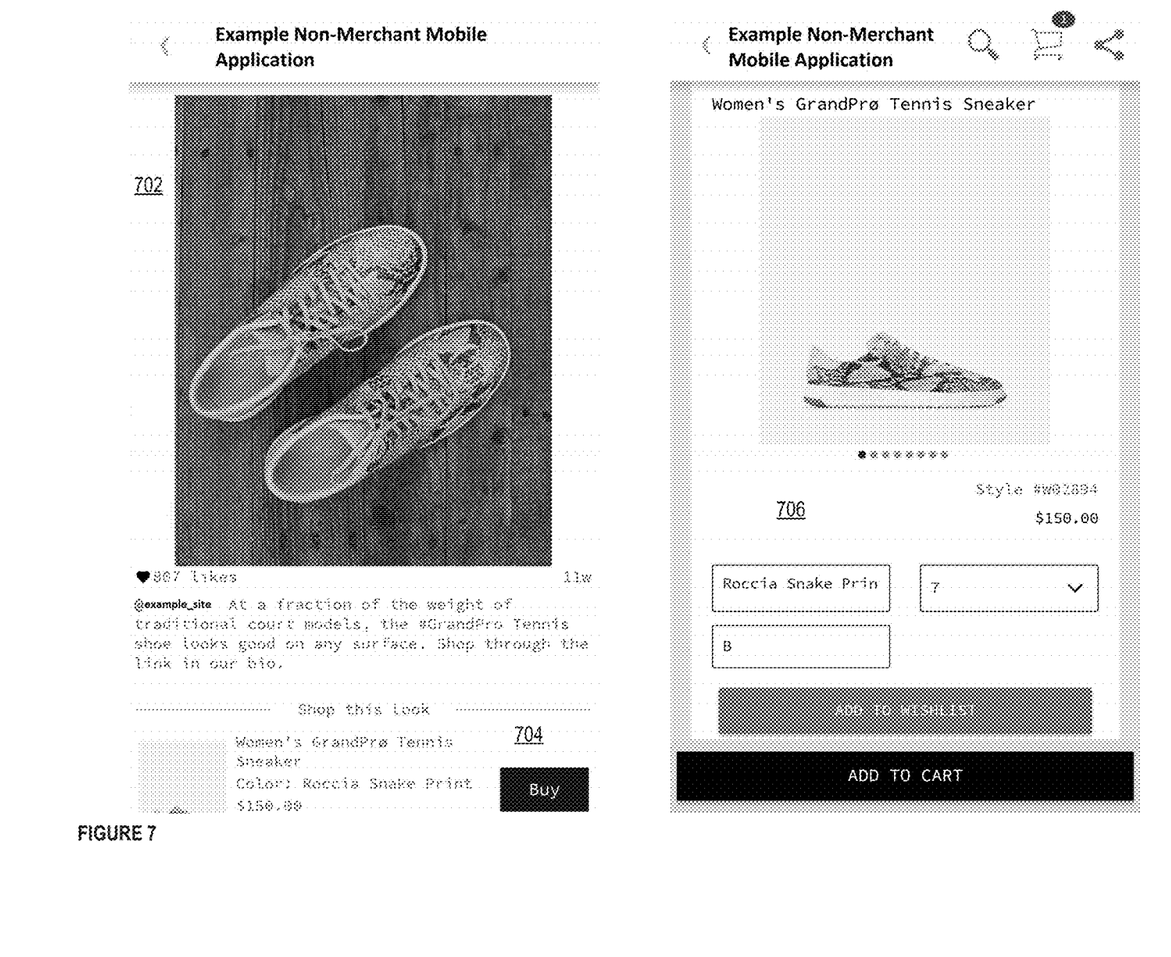
FIG. 7 is a flow diagram illustrating initiating a request for product information from a server running a different platform, according to an embodiment.

FIG. 7 is a screenshot diagram illustrating initiating a request for product information from a server running a different platform. For example, in some implementations, a consumer can view a product 702 (e.g., such as a pair of shoes) in a non-merchant interface 110 (such as a mobile application, a website, and/or the like). The non-merchant interface 110 can automatically retrieve product data 704 associated with the product when the user is viewing an image and/or other content associated with the product, and/or can retrieve the product data when the consumer clicks on, or otherwise interacts with, the content. The non-merchant interface 110 can be configured to render product inventory information when the user indicates a desire to obtain purchase information, e.g., when the consumer selects a "buy" and/or similar button. For example, the non-merchant interface 110 can display a product inventory information screen 706 indicating a price and/or inventory options for the product after the user has selected the "buy" button, using product inventory data provided by the commerce engine 106. By indicating a desire to purchase the product (e.g., by selecting the "Add to Cart" option, and/or the like), a consumer can initiate a transaction process between the consumer and the merchant server 108a. In such implementations, the commerce engine 106 can facilitate the transaction, without the non-merchant website 110 being configured to facilitate transactions. In this manner, the non-merchant website 110 can include content for allowing consumers to indicate a desire to purchase a product, without fully implementing commerce features that may not be used for the non-merchant website's 110 intended purpose.

While various embodiments have been described and illustrated herein, a variety of other means and/or structures for performing the function and/or obtaining the results and/or one or more of the advantages described herein, and each of such variations and/or modifications is deemed to be within the scope of the disclosure. More generally, all parameters, dimensions, materials, and configurations described herein are meant to be examples and that the actual parameters, dimensions, materials, and/or configurations will depend upon the specific application or applications. It is, therefore, to be understood that the foregoing embodiments are presented by way of example only.

The above-described embodiments can be implemented in any of numerous ways. For example, embodiments of designing and making the mobile configuration files and mobile application layouts disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the mobile configuration files and mobile application layouts disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various embodiments can be in the form of a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the disclosure discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods described herein need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various aspects of the description discussed herein may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for providing product inventory information to a non-merchant website, the apparatus comprising:
   a memory storing a plurality of commerce platform-specific conversion modules; and
   a processor configured to access data and execute processor-readable instructions in the memory, the processor-readable instructions causing the processor to:
   retrieve, from a plurality of merchant servers and using an Application Programming Interface (API), at least one data feed,
      each commerce platform-specific conversion module in the plurality of commerce platform-specific conversion modules being configured to translate, using information from the at least one data feed, at least one message from the non-merchant website into a product information request for a corresponding merchant server in the plurality of merchant servers,
      each commerce platform-specific conversion module in the plurality of commerce platform-specific conversion modules being configured to send the product information request to the corresponding merchant server based on routing table metadata,
   receive product inventory data from the corresponding merchant server from the plurality of merchant servers and in response to the product information request;
   generate a mapping schema that maps files and attributes supported by the corresponding merchant server to a platform-independent format;
   convert the product inventory data into a non-merchant copy of product inventory data based on the mapping schema, the non-merchant copy of the product inventory data being in a format processable by the non-merchant website; and
   send the non-merchant copy of product inventory data to the non-merchant website to facilitate a transaction via the non-merchant website based on the product inventory data.

2. The apparatus of claim 1, wherein a first commerce platform-specific conversion module from the plurality of commerce platform-specific conversion modules is associated with a commerce platform implemented at a first merchant server from the plurality of merchant servers.

3. The apparatus of claim 1, wherein the plurality of commerce platform-specific conversion modules collectively include a Demandware conversion module, an Art Technology Group (ATG) conversion module, and a Shopify conversion module.

4. The apparatus of claim 1, wherein:
the API includes instructions to obtain product inventory data from each merchant server from the plurality of merchant servers.

5. The apparatus of claim 1, wherein each commerce platform-specific conversion module from the plurality of platform-specific conversion modules is configured to translate the at least one message using settings configuration data obtained from a mobile workbench.

6. The apparatus of claim 1, wherein the at least one data feed includes at least one of (1) a brand data feed, (2) a product catalog data feed, (3) a merchant information data feed, (4) a product inventory feed, or (5) a promotional data feed.

7. The apparatus of claim 1, wherein the memory stores a metadata and configuration repository module configured to store metadata and configuration information associated with the plurality of merchant servers, and
the mapping schema configured to translate a message from the non-merchant website into a canonical format.

8. The apparatus of claim 1, wherein the memory stores a communications module configured to facilitate communications between the apparatus and the plurality of merchant servers.

9. A method, comprising:
retrieving, from a plurality of merchant servers and using an Application Programming Interface (API), at least one data feed;
storing a plurality of commerce platform-specific conversion modules, each commerce platform-specific conversion module in the plurality of commerce platform-specific conversion modules being configured to translate, using information from the at least one data feed, at least one message from a non-merchant website into a product information request for a corresponding merchant server in the plurality of merchant servers, each commerce platform-specific conversion module in the plurality of commerce platform-specific conversion modules being configured to send the product information request to the corresponding merchant server based on routing information associated with the corresponding merchant server;
receiving product inventory data from the corresponding merchant server from the plurality of merchant servers and in response to the product information request;
generating a mapping schema that maps files and attributes supported by the corresponding merchant server to a platform-independent format;
converting the product inventory data into a non-merchant copy of product inventory data based on the mapping schema, the non-merchant copy of the product inventory data being in a format processable by the non-merchant website; and
sending the non-merchant copy of product inventory data to the non-merchant website to facilitate a transaction via the non-merchant website based on the product inventory data.

10. The method of claim 9, wherein a first commerce platform-specific conversion module from the plurality of commerce platform-specific conversion modules is associated with a commerce platform implemented at a first merchant server from the plurality of merchant servers.

11. The method of claim 9, wherein the plurality of commerce platform-specific conversion modules collectively include a Demandware conversion module, an Art Technology Group (ATG) conversion module, and a Shopify conversion module.

12. The method of claim 9, wherein the API includes instructions to obtain product inventory data from each merchant server from the plurality of merchant servers.

13. The method of claim 9, wherein each commerce platform-specific conversion module from the plurality of platform-specific conversion modules is configured to translate the at least one message using settings configuration data obtained from a mobile workbench.

14. The method of claim 9, wherein the at least one data feed includes at least one of (1) a brand data feed, (2) a product catalog data feed, (3) a merchant information data feed, (4) a product inventory feed, or (5) a promotional data feed.

15. The method of claim 9, further comprising:
storing a metadata and configuration repository module configured to store metadata and configuration information associated with the plurality of merchant servers, and
storing the mapping schema configured to translate a message from the non-merchant website into a canonical format.

16. The method of claim 9, further comprising:
storing a communications module configured to facilitate communications between the apparatus and the plurality of merchant servers.

17. A non-transitory processor-readable medium storing code representing instructions to be executed by a processor, the code comprising code to cause the processor to:
retrieve, from a plurality of merchant servers and using an Application Programming Interface (API), at least one data feed;
translate, using information from the at least one data feed, at least one message from a non-merchant website into a product information request for a corresponding merchant server in the plurality of merchant servers;
send the product information request to the corresponding merchant server based on routing information associated with the corresponding merchant server;
receive product inventory data from the corresponding merchant server from the plurality of merchant servers and in response to the product information request;
generate a mapping schema that maps files and attributes supported by the corresponding merchant server to a platform-independent format;
convert the product inventory data into a non-merchant copy of product inventory data based on the mapping schema, the non-merchant copy of the product inventory data being in a format processable by the non-merchant website; and
send the non-merchant copy of product inventory data to the non-merchant website to facilitate a transaction via the non-merchant website based on the product inventory data.

18. The non-transitory processor-readable medium of claim 17, wherein the API includes instructions to obtain product inventory data from each merchant server from the plurality of merchant servers.

19. The non-transitory processor-readable medium of claim 17, the code further comprising code to cause the processor to:
translate the at least one message using settings configuration data obtained from a mobile workbench.

20. The non-transitory processor-readable medium of claim 17, wherein the at least one data feed includes at least one of (1) a brand data feed, (2) a product catalog data feed, (3) a merchant information data feed, (4) a product inventory feed, or (5) a promotional data feed.

* * * * *